Feb. 26, 1929.                                          1,703,278
                    A. CLAUD-MANTLE
                    LUBRICATING SYSTEM
                    Filed June 18, 1923
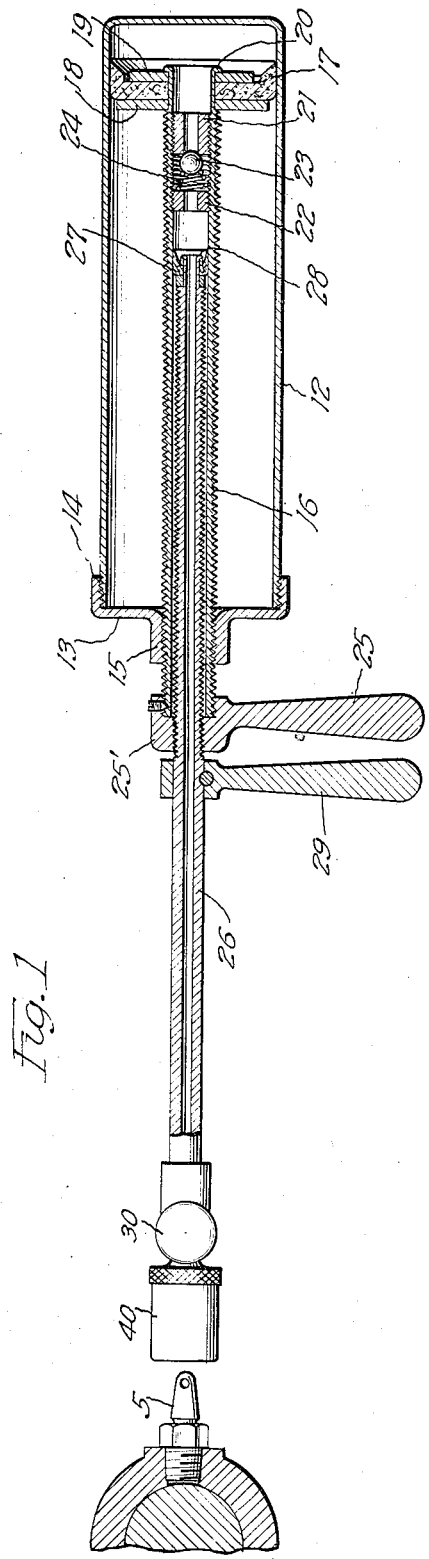
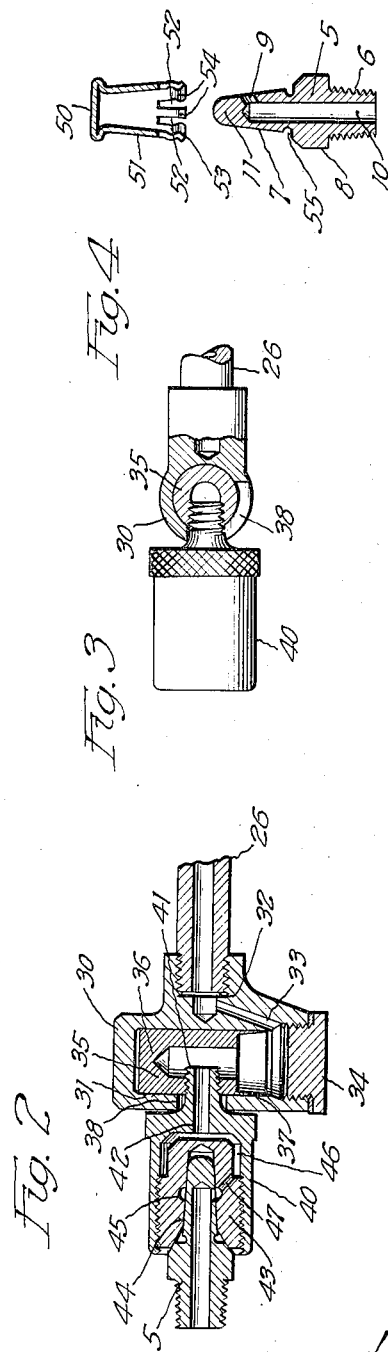
Inventor
A. Claud-Mantle Patented Feb. 26, 1929.

1,703,278

UNITED STATES PATENT OFFICE.

ARTHUR CLAUD-MANTLE, OF BRIDGEPORT, CONNECTICUT, ASSIGNOR TO ALEMITE MANUFACTURING CORPORATION OF CHICAGO, ILLINOIS, A CORPORATION OF DELAWARE.

LUBRICATING SYSTEM.

Application filed June 18, 1923. Serial No. 646,132.

My invention relates to improvements in lubricating systems, and is particularly concerned with improvements in that type of lubricating systems comprising a plurality of fittings or nipples to be secured to the bearings to be lubricated, and a compressor for supplying lubricant thereto under high pressure, the compressor comprising means for successively making sealed connections with the various fittings or nipples.

The objects of my invention are to provide a system of the character described comprising a novel type of fitting, and a compressor, including novel coupling means for easily and quickly making a sealed connection therewith;

Second, to provide a system of the character described, in which the coupling means is so constructed that connection with the fitting can be established from substantially any direction, thereby enabling lubricant to be supplied to a fitting located at a comparatively inaccessible point;

Third, to provide a compressor by means of which high pressures can be exerted upon the lubricant with very little exertion on the part of the operator, and Fourth, to provide a system of the character described which is simple in construction and economical to manufacture.

Other objects of my invention will appear as this description progresses, reference being had to the accompanying drawings, in which Figure 1 is a central longitudinal section through a portion of my improved compressor, parts thereof being in elevation, and a transverse section through a bearing equipped with one of my improved fittings, which is shown in elevation;

Figure 2 is a longitudinal section through the coupling means forming a part of my improved compressor, and a fitting showing these two parts in co-acting relation;

Figure 3 is a side elevation, partially in section, the section being taken at right angles to that shown in Figure 2, and Figure 4 is a central longitudinal section through one of my fittings and a dust cap therefor.

Throughout the several views, similar reference characters will be used for referring to similar parts.

The fitting forming a part of my improved lubricating system comprises an elongated tubular member 5, one end of which is threaded, as shown at 6, to enable it to be attached to a bearing to be lubricated, and the opposite end of which is tapered, as shown at 7, this taper being a comparatively small one, and preferably less than 2°. Intermediate its ends, the fitting is provided with facets 8 to enable a wrench to be used for securing the fitting to a bearing. An opening 9, extending through the tapered portion of the fitting, provides means for establishing communication with the bore 10 thereof. It will be noticed that the outer end of this bore is closed, as shown at 11.

My improved compressor for supplying lubricant to the fitting just described comprises a barrel 12 for receiving and holding a supply of lubricant. One end of this barrel is closed by means of a cap 13, which is detachably secured thereto by means of suitable screw threads 14, and which is provided with a central threaded nipple 15 for receiving the screw threaded piston rod 16. This piston rod is hollow, as shown in Figure 1, and at its inner end carries a piston comprising the cup leather 17, face plate 18, and follower plate 19. These elements are all assembled upon a reduced portion of the inner end of the piston rod 16, which is swedged outwardly, as shown at 20, to hold the parts in place.

A pair of sleeves 21 and 22 are secured in the bore of the hollow piston rod 16. The sleeve 21 forms a valve seat for a check valve 23 which is yieldingly held upon its seat by means of a compression spring 24 interposed between it and the sleeve 22. The outer end of the piston rod 16 has secured thereto a handle 25 by means of which it can be rotated, thereby causing the piston to move either inwardly or outwardly in the barrel 12.

A rigid discharge conduit 26, formed of a piece of tubing, is threaded into the hub 25' of the handle 25 and extends into the hollow piston rod 16. The inner end of this discharge conduit is provided with a gasket 27 which is mounted upon a reduced portion of the inner end of the discharge conduit and held in place by the outwardly swedged portion 28 of the discharge conduit. A handle 29 is secured to the discharge conduit 26 so as to enable it to be rotated, or to enable the operator to hold the discharge conduit 26 stationary while the handle 25 and nut 25' are rotated relatively thereto.

The outer end of the discharge conduit is provided with coupling means for making a detachable connection with fittings of the type described above. This coupling means comprises a body member 30 having the cylindrical bore 31 and another bore 32 extending at right angles thereto, in which is threaded the outer end of the discharge conduit 26. These two bores communicate by means of a third bore or passageway 33 formed in the body member. The open end of the bore 31 is closed by means of a screw threaded plug 34. A cylinder 35, one end of which is closed, as shown at 36, is rotatably mounted in the bore 31, and at its outer end is provided with an extremely thin wall 37 which is adapted to spring outwardly under the pressure of the lubricant, and seal the joint between the cylinder and the body member so as to prevent leakage of lubricant through the circumferentially extending slot 38 formed in the body member.

The coupling sleeve 40 is provided with an externally threaded reduced portion 41, which extends through the slot 38 and into the wall of the cylinder 35. This reduced portion is provided with a bore 42 for establishing communication between the bore of the cylinder 35 and the bore of the sleeve 40. A plug 43 is threaded into the outer end of the sleeve 40 and provided with a tapered bore 44 having an annular groove 45 formed in the wall thereof, this groove being so positioned that it registers with the opening 9 in the fitting when the fitting is completely inserted in this tapered bore. The inner end of the plug 43 is reduced in diameter to provide an annular passageway 46. A passageway 47 extends from the annular groove 45 to the annular passageway 46, thereby completing the communication between the compressor barrel and the bore of the fitting.

In the use of my improved lubricating system, the coupling means is attached to the fitting, as shown in Figure 2. The operator thereupon grasps the handle 25, and, holding it stationary, turns the barrel of the compressor, thereby forcing lubricant past the check valve 23 into the hollow piston rod 16, out through the discharge conduit 26 and the coupling means, into the fitting and the bearing. If the resistance of the bearing is so great as to make the above operation difficult, after substantially filling the hollow conduit 26 by rotation of the barrel 12 relatively to the handle 25 and the piston rod 16, the operator takes hold of the handle 29 and holds it stationary while rotating the barrel 12 relatively to it. The pressure upon the grease and the frictional contact between the grease, compressor barrel, and the piston head will usually be sufficient to cause the hollow piston rod 16 to rotate with the barrel, thereby causing the discharge conduit 26 to be forced into the hollow piston rod, and thus causing the lubricant to be displaced from this hollow piston rod, through the discharge conduit and into the bearing. The inner end of the discharge conduit can be made of such small diameter and the pitch of the threads on the discharge conduit can be made so small that excessively high pressures can be easily obtained in the manner described.

The tapered fit between the end of the fitting and the coupling means, if the taper is made small enough, will provide sufficient frictional contact between these members to prevent them from becoming displaced by the pressure of the lubricant, and since there are no interconnecting or interengaging coacting means upon the fitting and the coupling member, it is comparatively easy to connect the coupling means with and disconnect it from the fitting. Furthermore, by securing the coupling sleeve 40 to the cylinder 35, which is rotatably mounted in the body member 30, I have provided means which makes it possible to attach the compressor to a fitting located in a comparatively inaccessible position.

To protect the outer end of the fitting from dust and dirt, I prefer to provide a dust cap, such as shown in Figure 4, comprising the end portion 50, the flange portion 51, the outer end of which is slotted, as shown at 52 to form a plurality of spring tongues 53 which are curved inwardly intermediate their ends to form the ribs 54, which are adapted to spring into the annular groove 55 formed between the tapered portion and the facet portion of the fitting.

While I have described the preferred embodiment of my invention, it is to be understood that my invention is not to be limited thereto but is capable of other adaptations and modifications within the scope of the appended claims.

Having thus described my invention what I claim as new and desire to secure by Letters Patent of the United States is:

1. A lubricant compressor comprising a barrel, a hollow piston rod threaded through one end of said barrel, a piston carried by the inner end of said hollow piston rod, an outwardly opening spring pressed valve in said hollow piston rod, a discharge conduit threaded into said hollow piston rod and provided at its outer end with means for making a detachable connection with a lubricant receiving fitting, and handles secured to said hollow piston rod and said discharge conduit whereby said hollow piston rod and said discharge conduit can be rotated.

2. A lubricant compressor comprising a barrel, a hollow piston rod threaded through one end of said barrel, a piston carried by the inner end of said hollow piston rod, an outwardly opening spring pressed valve in said hollow piston rod, a discharge conduit movable axially in said hollow piston rod to increase the pressure on the lubricant, said rod provided at its outer end with means for making a detachable connection with a lubricant receiving fitting, and a handle secured to said hollow piston rod whereby said hollow piston rod can be rotated.

3. A lubricant compressor comprising a barrel, a hollow piston rod extending through one end of said barrel, a piston carried by the inner end of said hollow piston rod, an outwardly opening spring pressed valve in said hollow piston rod, a discharge conduit threaded into said hollow piston rod and provided at its outer end with means for making a detachable connection with a lubricant receiving fitting, and handles secured to said discharge conduit whereby said discharge conduit can be rotated relatively to said piston rod, to expel lubricant therefrom.

4. A lubricant compressor comprising a barrel, a hollow piston rod threaded through one end of said barrel, a piston carried by the inner end of said hollow piston rod, a discharge conduit threaded into said hollow piston rod and provided at its outer end with means for making a detachable connection with a lubricant receiving fitting, and handles secured to said hollow piston rod and said discharge conduit whereby said hollow piston rod and said discharge conduit can be rotated, separately, to compress said lubricant.

5. A compressor comprising a body, low pressure compressing means and high pressure compressing means axially disposed in said body, said low pressure means discharging to said high pressure means, and an independent rotary drive for each compressing means.

6. A compressor comprising a body, low pressure compressing means and high pressure compressing means axially disposed in said body, said low pressure means discharging to high pressure means, and an independent rotary drive for each compressing means, said high pressure means including mechanism whereby said low pressure means can push material at low pressure through and out of said high pressure means.

In witness whereof, I hereunto subscribe my name this 1st day of June, 1923.

ARTHUR CLAUD-MANTLE.